(12) United States Patent
Xu et al.

(10) Patent No.: US 8,248,147 B2
(45) Date of Patent: Aug. 21, 2012

(54) POWER SWITCH CIRCUIT FOR SINGLE POWER SUPPLY

(75) Inventors: Yan Xu, Shenzhen (CN); Yan-Ling Geng, Shenzhen (CN); Hui Yin, Shenzhen (CN); Bo-Ching Lin, Taipei Hsien (TW); Han-Che Wang, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 98 days.

(21) Appl. No.: 12/838,485

(22) Filed: Jul. 18, 2010

(65) Prior Publication Data

US 2011/0298524 A1 Dec. 8, 2011

(30) Foreign Application Priority Data

Jun. 7, 2010 (CN) .......................... 2010 1 0193331

(51) Int. Cl.
*H03K 17/687* (2006.01)
(52) U.S. Cl. ........ 327/434; 327/436; 327/437; 323/282; 323/283

(58) Field of Classification Search .................. 327/434, 327/436, 437; 323/282, 283
See application file for complete search history.

(56) References Cited

U.S. PATENT DOCUMENTS

| | | | | |
|---|---|---|---|---|
| 5,302,889 | A * | 4/1994 | Marsh | 323/284 |
| 6,340,852 | B1 * | 1/2002 | Mizoguchi | 307/125 |
| 7,420,355 | B2 * | 9/2008 | Liu et al. | 323/271 |
| 2006/0255785 | A1 * | 11/2006 | Kanzaki | 323/282 |

FOREIGN PATENT DOCUMENTS

CN 101534051 A 9/2009

* cited by examiner

*Primary Examiner* — Kenneth B. Wells
(74) *Attorney, Agent, or Firm* — Altis Law Group, Inc.

(57) ABSTRACT

A power switch circuit providing voltage to an output port is provided. The switch circuit includes a single power supply, a switch unit, a controlling unit, and a logic unit. The switch unit is connected between the single power supply and an output port and capable of being turned on and off alternatively for continuing or discontinuing power from the single power supply to the output port; the single power supply provides power to the output port. The controlling unit is configured for generating a voltage controlling signal and transmitting the voltage controlling signal to the logic unit. The logic unit receives and inverts the voltage controlling signal, and outputs the inverted voltage controlling signal to turn on or turn off the switch unit.

13 Claims, 2 Drawing Sheets

POWER SWITCH CIRCUIT FOR SINGLE POWER SUPPLY

BACKGROUND

1. Technical Field

The present disclosure relates to power switch circuits and, particularly, to a power switch circuit with a single power supply.

2. Description of the Related Art

A power switch circuit usually outputs a common-mode voltage with double power supply including one power supply providing a positive voltage (e.g., +5V) and the other power supply providing a negative voltage (e.g., −5V). However, the common-mode voltage formed by both the positive voltage and the negative voltage may exceed the voltage rating of certain electronic components of an electronic device and damage those electronic components.

Therefore, what is needed is a novel power switch circuit with a single power supply to replace the double power supply.

BRIEF DESCRIPTION OF THE DRAWINGS

The components in the drawings are not necessarily drawn to scale, the emphasis instead being placed upon clearly illustrating the principles of a power switch circuit with a single power supply. Moreover, in the drawings, like reference numerals designate corresponding parts throughout the several views.

DETAILED DESCRIPTION

Figure 1:
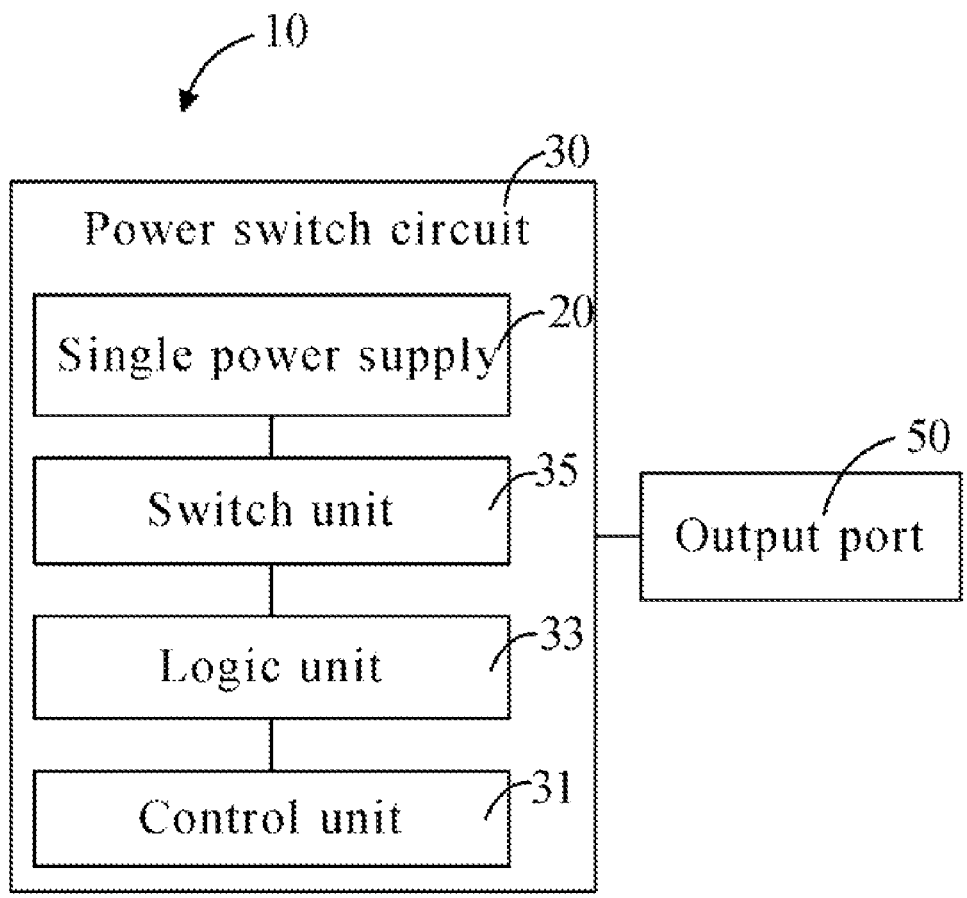
FIG. 1 is a block diagram of a power switch circuit with a single power supply in accordance with an exemplary embodiment.

Referring to FIG. 1, an embodiment of a power switch circuit 30 is illustrated. The power switch circuit 30 connects to an output port 50 to provide power to the output port 50.

The power switch circuit 30 includes a single power supply 20, a control unit 31, a logic unit 33, and a switch unit 35. In the embodiment, an anode of the single power supply 20 is grounded, and a cathode of the single power supply 20 is connected to the switch unit 35.

The control unit 31 is configured for generating a voltage control signal and transmitting the voltage control signal to the logic unit 33. In the embodiment, the control unit 31 can be a square wave generator or a rectangular wave generator.

The logic unit 33 is configured for inverting the voltage control signal and outputting the inverted voltage control signal to turn on or turn off the switch unit 35.

Figure 2:
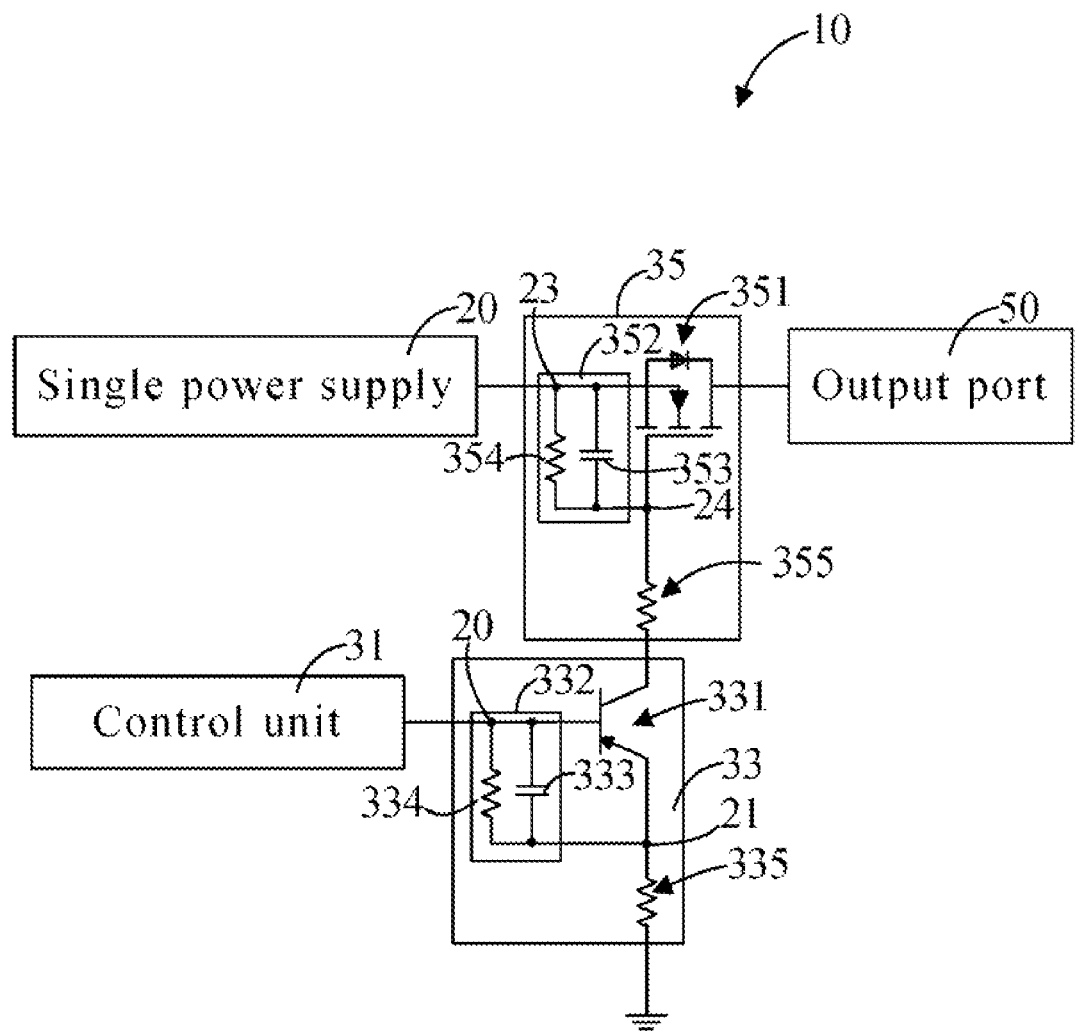
FIG. 2 is a circuit diagram of the power switch circuit of FIG. 1.

Referring to FIG. 2, the logic unit 33 includes a first resistor 335 and a transistor 331. In the embodiment, the transistor 331 is a PNP transistor. The base of the PNP transistor 331 is connected to the control unit 31, the collector of the PNP transistor 331 is connected to the switching unit 35, and the emitter of the PNP transistor 331 is connected to ground via the first resistor 335. The logic unit 33 further includes a first filter 332. The first filter 332 is configured for filtering noises from signals outputted by the control unit 31. The first filter 332 includes a resistor 334 and a capacitor 333 connected in parallel between the base and the emitter of the PNP transistor 331.

The switch unit 35 includes a second resistor 355 and a transistor 351. In the embodiment, the transistor 351 is an NMOS transistor. The source of the NMOS transistor 351 is connected to the single power supply 20, the drain of the NMOS transistor 351 is connected to the output port 50, and the gate of the NMOS transistor 351 is connected to the collector of the PNP transistor 331 via the second resistor 355. The switch unit 35 includes a second filter 332. The second filter 332 is configured for filtering the noises from the voltage outputted by the single power supply 20. The second filter 332 includes a resistor 354 and a capacitor 353 connected in parallel between the drain and the gate of the NMOS transistor 351.

When the control unit 31 outputs a high negative voltage (e.g., −3V) to the base of the PNP transistor 331, the PNP transistor 331 is turned on. The collector of the PNP transistor 331 outputs a high positive voltage (e.g., +3V) to the gate of the NMOS transistor 351 via the second resistor 355. The NMOS transistor 351 is also turned on, thus the single power supply 20 can provide voltage to the output port 50 via the switch unit 35.

When the control unit 31 outputs a high positive voltage to the base of the PNP transistor 331, the PNP transistor 331 is turned off, thus there is no voltage drop between the gate and the source of the NMOS transistor 351, and the NMOS transistor 351 is turned off. Therefore, the switch unit 35 cuts off the power from the single power supply 20 to the output port 50.

It is understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A power switch circuit with a single power supply, comprising:

a control unit configured for generating a voltage controlling signal;

a logic unit comprising a PNP transistor and a first resistor, wherein the PNP transistor is configured to receive and invert the voltage controlling signal, and output the inverted voltage controlling signal; and a switch unit connected between the single power supply and an output port and configured for being turned on and off alternatively according to the inverted voltage controlling signal output by the PNP transistor to continue or discontinue the power from the single power supply provided to the output port;

wherein a base of the PNP transistor is connected to the control unit, a collector of the PNP transistor is connected to the switch unit, and an emitter of the PNP transistor is grounded via the first resistor.

2. The power switch circuit as claimed in claim 1, wherein the controlling unit is a square wave generator or a rectangular wave generator.

3. The power switch circuit as claimed in claim 1, wherein the logic unit further comprises a filter configured for filtering noises from the voltage controlling signal outputted by the control unit.

4. The power switch circuit as claimed in claim 3, wherein the filter includes a resistor and a capacitor connected in parallel between the base and the emitter of the PNP transistor.

5. The power switch circuit as claimed in claim 1, wherein the switch unit comprises a second resistor and a switching transistor, and the switching transistor is connected to the logic unit via the second resistor.

6. The power switch circuit as claimed in claim 5, wherein the switching transistor is an NMOS transistor; the source of the NMOS transistor is connected to the single power supply, the drain of the NMOS transistor is connected to the output port, and the gate of the NMOS transistor is connected to the collector of the PNP transistor via the second resistor.

7. The power switch circuit as claimed in claim 6, wherein the switch unit further comprises a filter configured for filtering noises from the voltage outputted by the single power supply.

8. The power switch circuit as claimed in claim 7, wherein the filter includes a resistor and a capacitor connected in parallel between the source and the gate of the NMOS transistor.

9. The power switch circuit as claimed in claim 1, wherein an anode of the single power supply is grounded, and a cathode of the single power supply is connected to the switch circuit.

10. The power switch circuit as claimed in claim 1, wherein the switch unit comprises a second resistor and a switch connected to the logic unit via the second resistor.

11. The power switch circuit as claimed in claim 10, wherein the switch is an NMOS transistor; and the source of the NMOS transistor is connected to the single power supply, the drain of the NMOS transistor is connected to the output port, and the gate of the NMOS transistor is connected to the collector of the PNP transistor via the second resistor.

12. A power switch circuit with a single power supply, comprising:

a control unit configured for generating a voltage controlling signal;
  a logic unit comprising a first switch and a first resistor, wherein the first switch is configured to receive and invert the voltage controlling signal, and output the inverted voltage controlling signal; and
  a switch unit connected between the single power supply and an output port and comprising a second resistor and a second switch connected to the logic unit via the second resistor, wherein the second switch is configured for being turned on and off alternatively according to the inverted voltage controlling signal output by the first switch to continue or discontinue the power from the single power supply provided to the output port;
  wherein a first terminal of the first switch is connected to the control unit, a second terminal of the first switch is connected to the switch unit, and a third terminal of the first switch is grounded via the first resistor.

13. The power switch circuit as claimed in claim 12, wherein the second switch is an NMOS transistor; and the source of the NMOS transistor is connected to the single power supply, the drain of the NMOS transistor is connected to the output port, and the gate of the NMOS transistor is connected to the first switch via the second resistor.

* * * * *